United States Patent [19]

Scherbner

[11] 4,034,954

[45] July 12, 1977

[54] COPPER-NICKEL PLASTIC MOLD ALLOY AND RESULTANT MOLD

[75] Inventor: Paul J. Scherbner, Boyertown, Pa.

[73] Assignee: Kawecki Berylco Industries, Inc., Reading, Pa.

[21] Appl. No.: 591,054

[22] Filed: June 27, 1975

[51] Int. Cl.² .................. B28B 7/34; C22C 9/06
[52] U.S. Cl. .................. 249/135; 75/159; 75/161; 75/164; 148/32.5; 75/153; 148/160
[58] Field of Search .................. 75/159, 161, 164; 425/117, 242 R, 450.1, 131.1, 247, DIG. 224, 227; 148/32.5, 153, 160; 249/135; 164/273 R, 273 M, 303, 374

[56] References Cited

U.S. PATENT DOCUMENTS

| 2,102,238 | 12/1937 | Pilling et al. | 75/159 |
|---|---|---|---|
| 2,215,905 | 9/1940 | Kihlgren | 75/159 |
| 2,234,552 | 3/1941 | Dean et al. | 75/159 |
| 3,488,188 | 1/1970 | Paces et al. | 75/159 |
| 3,728,106 | 4/1973 | Badia et al. | 75/159 |

FOREIGN PATENT DOCUMENTS

| 521,731 | 5/1940 | United Kingdom | 75/159 |

*Primary Examiner*—Walter R. Satterfield
*Attorney, Agent, or Firm*—Pennie & Edmonds

[57] ABSTRACT

An alloy for fabricating plastic molds consisting essentially of between about 0.4 and 2.0 weight percent beryllium, between about 29.0 and 33.0 weight percent nickel, between about 0.4 and 1.0 weight percent iron, between about 0.4 and 1.0 weight percent manganese, between about 0.05 and 0.3 weight percent zirconium, between about 0.05 to 0.30 weight percent titanium, and the balance copper. Plastic injection molds fabricated from said alloy are able to withstand the corrosive conditions present when fire retardant plastics are formed and are able to reproduce pattern detail completely and accurately.

5 Claims, No Drawings

COPPER-NICKEL PLASTIC MOLD ALLOY AND RESULTANT MOLD

BACKGROUND OF THE INVENTION

This invention relates to novel alloys and molds fabricated therefrom that are intended for use in the molding of fire resistant plastic articles.

By way of example, injection molding generally is an intermittent, cyclic process in which particles of plastic material containing a "blowing agent" incorporated therein are heated until they soften. The resulting mass is then forced into a closed mold at pressures of, for example, from 10,000 to 20,000 p.s.i., wherein it solidifies to form a solid article shaped in the reverse image of the mold.

Practically any thermoplastic material can be molded. Both branched and linear polyethylene as well as formulations of poly(vinyl chloride), polystyrenes and polyurethanes are now being used in commercial quantities in the manufacture of containers, toys, and household and industrial products by injection molding. In making fire resistant articles, such as television cabinets, fire retardant materials are incorporated with the thermoplastic material. Such fire retardant materials usually contain bromine, chloride or antimony oxide compounds and are corrosive as are some of their decomposition products.

As a consequence, molds and dies must be resistant to this corrosive action. Existing mold materials which are so resistant are unable, however, when cast to reproduce the detail required.

Attempts to obtain pattern detail completely and accurately while at the same time making the molds and dies immune to the corrosive action of the fumes formed during formation of the fire retardant plastic articles have, up to now, not been successful.

SUMMARY OF THE INVENTION

The present invention provides an improved metallic material for fabricating molds and the resultant molds for the molding of fire resistant plastic articles which are immune to corrosive attach during formation of the articles and which can faithfully reproduce all of the details of the original design.

The foregoing objects are achieved according to the present invention by a novel alloy consisting essentially of between about 0.4 and 2.0 weight percent beryllium, between about 29.0 and 33.0 weight percent nickel, between about 0.4 and 1.0 weight percent iron, between about 0.4 and 1.0 weight percent manganese, between 0.1 and 0.3 weight percent zirconium, between about 0.05 and 0.30 weight percent titanium, and the balance copper.

The above-described alloy of the present invention possesses good casting properties and molds and dies made therefrom have a high resistance to the corrosive action of the fire resistant materials used in making fire-resistant articles and can reproduce pattern detail completely and accurately in the plastic articles formed. In addition, and also very importantly, such molds have excellent thermal conductivity such that plastic articles made therein cool properly and, when removed from the mold or die, do not crack, warp, or have fissures therein due to thermal stress.

DETAILED DESCRIPTION

In a generally preferred embodiment of the invention, the molding alloy, which can be formulated from its components by alloying procedures known in the art, consists essentially of between about 0.4 and 2.0 weight percent beryllium, (preferably about 1.0%), between about 29.0 and 33.0 weight percent nickel, between about 0.4 and 1.0 weight percent iron, between about 0.4 and 1.0 weight percent manganese, between about 0.05 and 0.3 weight percent zirconium, between about 0.05 and 0.30 weight percent titanium, and the balance copper.

Preferred alloy compositions within the scope of the present invention are those utilizing about 1.0% by weight of beryllium, the following being the most desirable formulation:

| Component | Weight Percent |
| --- | --- |
| Beryllium | 1.0 – 1.25% |
| Nickel | 29.0 – 33.0 |
| Iron | 0.4 – 1.0 |
| Manganese | 0.4 – 1.0 |
| Zirconium | 0.05 – 0.30 |
| Titanium | 0.05 – 0.20 |
| Copper | Balance |

It will be understood that minor amounts of cobalt are found in commercially available nickel and thus, pure nickel may contain as much as 0.03 weight percent cobalt. Such contaminating cobalt is not necessary in the instant invention, does not adversely affect the instant alloy, and this comment as to its presence is simply to make clear its association with commercially available nickel.

DESCRIPTION OF A PREFERRED EMBODIMENT

The following example is provided for the purpose of further illustrating, but not limiting, the present invention and its attendant advantages. All parts and percentages are by weight unless otherwise indicated.

A casting is made in a conventional manner using a pre-fired ceramic refractory mold containing a cavity of the proper mold configuration. The alloy used in producing this mold has the following composition range:

| Component | Weight Percent |
| --- | --- |
| Beryllium | 1.0 – 1.1 |
| Nickel | 29.0 – 33.0 |
| Iron | 0.4 – 1.0 |
| Manganese | 0.4 – 1.0 |
| Zirconium | 0.1 – 0.3 |
| Titanium | 0.05 – 0.15 |
| Copper | Balance |

The alloy is melted in an induction furnace in air and is then poured to fill the cavity at 2300°–2500° F. After casting, the mold is removed, cleaned, aged, machined, and put into service. Using this mold, molded polyvinyl chloride parts containing antimony oxide are fabricated without problem at 12,000 p.s.i. injection pressure, an injection temperature of about 425° F. and a water-cooled molding temperature of 70°–75° F. The final part is as good as the first and no noticeable deterioration of the alloy mold is observed.

It is also to be noted that the enhanced corrosion-resistance of the alloys of the present invention also applies to resistance to the saturated ammonia vapors generated by some of the blowing resins used in some injection molding plastics.

As used herein, the phrase "plastic injection mold" is meant to include all molds and dies suitable for the injection molding of plastics. Generally, such molds are split molds clamped under pressure and having an orifice through which the molten plastic material is injected into a cavity in the mold.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:
1. An alloy casting consisting essentially of between about 1.0 and 1.25 weight percent beryllium, between about 29.0 and 33.0 weight percent nickel, between about 0.4 and 1.0 weight percent iron, between about 0.4 and 1.0 weight percent manganese, between about 0.05 and 0.3 weight percent zirconium, between 0.05 and 0.30 weight percent titanium, and the balance copper; said casting being further characterized by being suitable for fabricating plastic injection molds for the injection molding of fire-resistant plastics containing fire-retardant material, said injection mold being able to withstand the corrosive effect of the fire-retardant materials.

2. An alloy casting according to claim 1 consisting essentially of about 1.06 weight percent beryllium, between about 29.0 and 33.0 weight percent nickel, between about 0.4 and 1.0 weight percent iron, between about 0.4 and 1.0 weight percent manganese, between about 0.1 and 0.3 weight percent zirconium, between about 0.05 and 0.15 weight percent titanium, and the balance copper.

3. A shaped plastic injection mold suitable for the injection molding of shaped articles of fire-resistant plastics containing fire-retardant materials, said injection mold being fabricated from an alloy consisting essentially of between about 0.4 and 2.0 weight percent beryllium, between about 29.0 and 33.0 weight percent nickel, between about 0.4 and 1.0 weight percent iron, between about 0.4 and 1.0 weight percent manganese, between about 0.05 and 0.3 weight percent zirconium, between about 0.05 and 0.30 weight percent titanium, and the balance copper, said injection mold being further characterized by being able to withstand the corrosive effects of the fire-retardant materials.

4. A shaped plastic injection mold according to claim 3 wherein the alloy from which the injection mold is fabricated consists essentially of between about 1.0 and 1.25 weight percent beryllium, between about 29.0 and 33.0 weight percent nickel, between about 0.4 and 1.0 weight percent iron, between about 0.4 and 1.0 weight percent manganese, between about 0.05 and 0.3 weight percent zirconium, between about 0.05 and 0.20 weight percent titanium, and the balance copper.

5. A shaped plastic injection mold according to claim 3 wherein the alloy from which the injection mold is fabricated consists essentially of about 1.06 weight percent beryllium, between about 29.0 and 33.0 weight percent nickel, between about 0.4 and 1.0 weight percent iron, between about 0.4 and 1.0 weight percent manganese, between about 0.1 and 0.3 weight percent zirconium, between about 0.05 and 0.15 weight percent titanium, and the balance copper.

* * * * *